Sept. 6, 1955
G. L. BIEHN
2,716,870
REVERSE CYCLE HEAT PUMP SYSTEM
Filed April 1, 1953
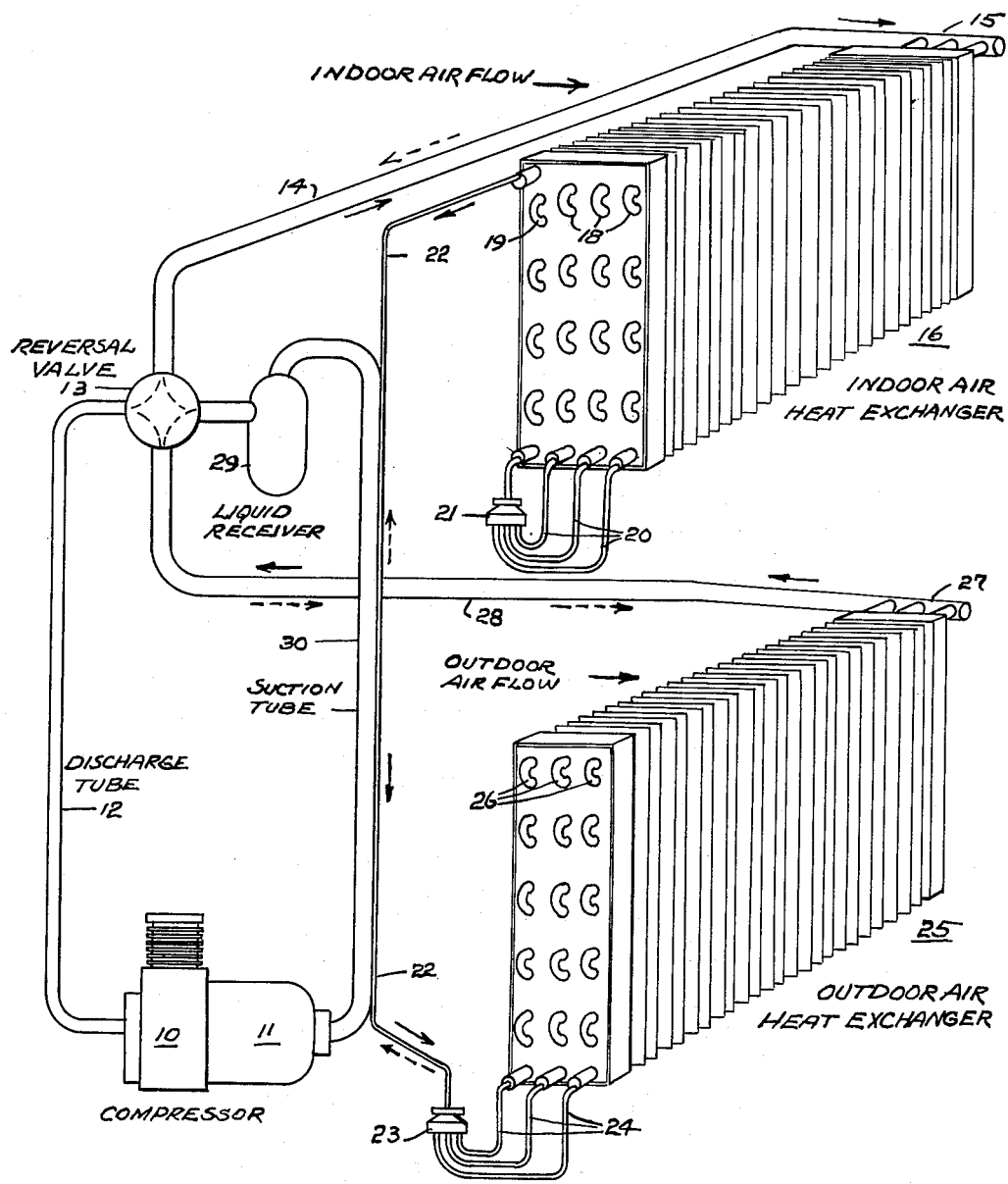
INVENTOR.
GERALD L. BIEHN
BY Robert J. Palmer
Attorney

2,716,870
REVERSE CYCLE HEAT PUMP SYSTEM

Gerald L. Biehn, Needham, Mass., assignor to Westinghouse Electric Corporation, East Pittsburgh, Pa., a corporation of Pennsylvania Application April 1, 1953, Serial No. 346,227

8 Claims. (Cl. 62—115)

This invention relates to reverse cycle refrigeration systems used for heating and cooling indoor air, also known as "heat pumps," and has as an object to improve both the air heating and the air cooling performances of such systems.

In early heat pumps, the indoor air heat exchangers used as air cooling evaporators during the cooling cycle, and as air heating condensers during the heating cycle, did not provide adequate heat during the heating cycle, so that it became the practice to increase the capacity of such a heat pump by using an additional indoor air heat exchanger as a sub-cooler located upstream with respect to the flow of indoor air, of the main indoor air heat exchanger. In passing through the sub-cooler, the liquid refrigerant gives up some heat to the indoor air passing over the surface of the sub-cooler. The capacity and efficiency of the system is increased by the sub-cooling.

However, in such systems, the sub-coolers also acted as sub-coolers during the cooling cycle, and gave up heat to the air passing over the surfaces of the main indoor air heat exchangers acting as air cooling evaporators, thus increasing the loads on the air cooling evaporators and reducing the capacities of the systems during the cooling cycle.

This invention provides a heat pump in which an auxiliary indoor air heat exchanger acts as a sub-cooler during the heating cycle, but acts as a pre-evaporator during the cooling cycle.

Another object of my invention is to use in a heat pump, a sub-cooler for increasing the capacity of the heat pump and for increasing the heat added to the indoor air during the heating cycle, but which does not act as a sub-cooler during the cooling cycle.

My invention will now be described with reference to the drawing which is a diagrammatic view of a heat pump system embodying the invention.

The hermetically sealed, refrigerant compressor 10 driven by the built-in electric motor 11, has its discharge side connected through the tube 12 to the reversing valve 13. During the heating cycle, the valve 13 is adjusted to route the refrigerant from the tube 12 through the tube 14 to the header 15 of the indoor air heat exchanger 16. The solid line arrows along the tubing indicate the direction of the flow of the refrigerant during the heating cycle.

The indoor air heat exchanger 16 has the three vertical rows 18 of finned tubes forming the main indoor air heat exchanger, and has the additional vertical row 19 of finned tubes located upstream with respect to indoor air flow of the rows 18, and acting during the heating cycle, as a sub-cooler.

The refrigerant flows at this time, from the header 15 into the top tubes of the three rows of tubes 18, in parallel, and then out the bottom tubes of the three rows 18 and through the three distributor tubes 20 in parallel, into the header 21. The refrigerant then flows into the bottom tube of the row 19, then out the top tube of the row 19, then through the capillary tube 22 into the header 23, then from the latter through the three distributor tubes 24 in parallel, then into the bottom tubes of the outdoor air heat exchanger 25 which has three vertical rows 26 of finned tubes.

The distributor tubes 24 at this time, act to supply the refrigerant into the outdoor heat exchanger 25 acting as evaporator. The expanded refrigerant passes out the top tubes of the outdoor heat exchanger in parallel, into the header 27, then through the tube 28 and reversing valve 13, the receiver 29 and the suction tube 30 to the suction side of the compressor 10.

The liquid in the capillary tube 22 which extends in heat exchange contact with the suction tube 30, adds heat to the suction gas, which heat appears as superheat in the indoor heat exchanger.

The three rows 18 of the indoor heat exchanger 16 act as a condenser during the air heating cycle, the indoor air being circulated by a fan which is not illustrated, over the surfaces of the indoor heat exchanger and absorbing the latent heat of vaporization and some sensible heat from the refrigerant as it condenses from a gas to a liquid. The sub-cooler row 19 of tubes gives up some heat to the indoor air. It sub-cools the liquid about 25° F., thus increasing the refrigerating effect, and the capacity of the system.

During the heating cycle, the outdoor air heat exchanger 25 acts as an evaporator extracting heat from the outdoor air which is circulated over its surfaces by a fan which is not illustrated.

During the air cooling cycle, the reversing valve 13 routes the refrigerant from the discharge tube 12 in the direction indicated by the dashed-line arrows along the tubing. The refrigerant flows from the reversing valve 13 through the tube 28 and header 27 into the top tubes of the outdoor air heat exchanger 25 acting as condenser, then out the bottom tubes of the heat exchanger 25, through the distributor tubes 24, then through the header 23 into the capillary tube 22. The refrigerant then flows from the capillary tube 22 into the top tube of the row 19 of tubes of the indoor heat exchanger 16, which row acts at this time as a pre-evaporator. The refrigerant then passes out the bottom tube of the row 19 and through the distributor or header 21 into the distributor tubes 20 in parallel, through which the refrigerant is further expanded, into the rows 18 of tubes of the indoor air heat exchanger 16, by being supplied into the bottom tubes of these rows. The rows 18 of tubes serve at this time as the main evaporator. The refrigerant then flows out the top tubes of the rows 18, then through the header 15, the tube 14, the reversing valve 13, the receiver 28 and the tube 29 to the suction side of the compressor.

The liquid in the capillary tube 22 which interconnects the indoor air and outdoor air heat exchangers, is cooled by the vapor in the suction tube 29 so that the liquid in the tube 22 reaching the indoor air heat exchanger acting as evaporator at this time, has its temperature reduced.

In prior heat pump systems which used sub-coolers during the heating cycle, the sub-coolers also acted as sub-coolers during the cooling cycle. In a typical such prior system, the liquid from the condenser passed first through the sub-cooler during the cooling cycle, then through a heat exchanger in heat exchange contact with the suction gas flowing to the suction side of the compressor, and then through an expansion valve into the evaporator. The sub-cooler thus added heat to the air passing over the evaporator surface, and reduced the cooling capacity of the system.

In the system of this invention, the liquid from the condenser is seen to be cooled by heat exchange contact with the suction gas, and expanded into a pre-evaporator.

In both the heating and cooling cycles, the compressed gas is supplied into the top of the heat exchanger acting as condenser, and the liquid is taken out the bottom of this heat exchanger. This avoids the flashing which would occur if the inlet and outlet connections were reversed.

By using separate external inlet and outlet tubes for each vertical row of heat exchange tubes, each row is equally loaded during both the heating and cooling cycles.

What is claimed is:

1. A heat pump system comprising a first indoor air heat exchanger, a second indoor air heat exchanger located adjacent and downstream with respect to the flow of indoor air of said first exchanger, an outdoor air heat exchanger, a refrigerant compressor, a reversal valve, means including suction and discharge tubes connecting said valve to said compressor, first refrigerant flow means connecting said outdoor and first indoor exchangers, second refrigerant flow means connecting said valve and second exchanger, third refrigerant flow means connecting said valve and said outdoor exchanger, and fourth refrigerant flow means connecting said first and second exchangers, said valve during air cooling operation supplying refrigerant through said third flow means to said outdoor exchanger from which the refrigerant flows through said first flow means to said first indoor exchanger from which the refrigerant flows through said fourth flow means to said second indoor exchanger from which the refrigerant flows through said second flow means back to said valve, said valve during air heating operation supplying refrigerant through said second flow means to said second indoor exchanger from which the refrigerant flows through said fourth flow means to said first indoor exchanger from which the refrigerant flows through said first flow means to said outdoor exchanger from which the refrigerant flows through said third flow means back to said valve.

2. A heat pump system as claimed in claim 1 in which the refrigerant flow means connecting the outdoor exchanger with the first indoor exchanger comprises a capillary tube.

3. A heat pump system comprising a first indoor air heat exchanger having a vertical row of tubes, a second indoor air heat exchanger located adjacent and downstream with respect to the flow of indoor air of said first exchanger and having a plurality of vertical rows of tubes, an outdoor air heat exchanger having a plurality of vertical rows of tubes, a refrigerant compressor, a reversal valve, means including suction and discharge tubes connecting said valve and compressor, first refrigerant flow means connecting the bottom tubes of said outdoor exchanger with the top tube of said first indoor exchanger, second refrigerant flow means connecting said valve with the top tubes of said second exchanger, third refrigerant flow means connecting said valve and said outdoor exchanger, and fourth refrigerant flow means connecting the bottom tube of said first exchanger with the bottom tubes of said second exchanger, said valve during air cooling operation supplying refrigerant through said third flow means to said outdoor exchanger from which the refrigerant flows through said first flow means to said first indoor exchanger from which the refrigerant flows through said fourth flow means to said second indoor exchanger from which the refrigerant flows through said second flow means back to said valve, said valve during air heating operation supplying refrigerant through said second flow means to said second indoor exchanger from which the refrigerant flows through said fourth flow means to said first indoor exchanger from which the refrigerant flows through said first flow means to said outdoor exchanger from which the refrigerant flows through said third flow means back to said valve.

4. A heat pump system as claimed in claim 3 in which the refrigerant flow means connecting the outdoor and first indoor exchangers comprises a capillary tube.

5. A heat pump system as claimed in claim 4 in which the refrigerant flow means connecting the outdoor and first indoor exchangers includes a plurality of distributor tubes connecting the capillary tube and the bottom tubes of the second indoor exchanger.

6. A heat pump system as claimed in claim 5 in which the refrigerant flow means connecting the bottom tubes of the second indoor exchanger with the bottom tube of the first indoor exchanger includes an external tube connected to the bottom tube of the first indoor exchanger, and a plurality of distributor tubes connected to the external tube and the bottom tubes of the second indoor exchanger.

7. A heat pump system as claimed in claim 3 in which the refrigerant flow means connecting the outdoor exchanger with the first indoor exchanger comprises a capillary tube, and in which the refrigerant flow means connecting the bottom tubes of the second indoor exchanger with the bottom tube of the first indoor exchanger includes an external tube connected to the bottom tube of the first indoor exchanger, and a plurality of distributing tubes connected to the external tube and the bottom tubes of the second indoor exchanger.

8. A heat pump system comprising a first indoor air heat exchanger, a second indoor air heat exchanger located adjacent and downstream with respect to the flow of indoor air of said first exchanger, an outdoor air heat exchanger, a refrigerant compressor, a reversal valve, means including suction and discharge tubes connecting said valve to said compressor, first refrigerant flow means comprising a capillary tube connecting said outdoor and first indoor exchangers, second refrigerant flow means connecting said valve and second indoor exchanger, third refrigerant flow means connecting said valve and said outdoor exchanger, and fourth refrigerant flow means connecting said first and second indoor exchangers, said valve during air cooling operation supplying refrigerant through said third flow means to said outdoor exchanger from which the refrigerant flows through said first flow means to said first indoor exchanger from which the refrigerant flows through said fourth flow means to said second indoor exchanger from which the refrigerant flows through said second flow means back to said valve, said valve during air heating operation supplying refrigerant through said second flow means to said second indoor exchanger from which the refrigerant flows through said fourth flow means to said first indoor exchanger from which the refrigerant flows through said first flow means to said outdoor exchanger from which the refrigerant flows through said third flow means back to said valve.

References Cited in the file of this patent

UNITED STATES PATENTS

| | | |
|---|---|---|
| 2,148,415 | Labberton | Feb. 21, 1939 |
| 2,474,304 | Clancy | June 28, 1949 |
| 2,530,681 | Clancy | Nov. 21, 1950 |